(No Model.)

G. B. DAMON.
ELECTRIC CAR BRAKE.

No. 541,073. Patented June 18, 1895.

WITNESSES
Fisher M. Pearson
Gardner M. Pearson

INVENTOR
George B. Damon

UNITED STATES PATENT OFFICE.

GEORGE B. DAMON, OF LOWELL, MASSACHUSETTS, ASSIGNOR OF ONE-HALF TO GARDNER W. PEARSON, OF SAME PLACE.

ELECTRIC-CAR BRAKE.

SPECIFICATION forming part of Letters Patent No. 541,073, dated June 18, 1895.

Application filed April 30, 1894. Serial No. 509,570. (No model.)

*To all whom it may concern:*

Be it known that I, GEORGE B. DAMON, of Lowell, in the county of Middlesex and State of Massachusetts, have invented a new and useful Improvement in Electric-Car Brakes, of which the following, taken in connection with the accompanying drawings, is a specification.

This invention relates to a system of air brakes for electric cars, the object being to provide a system of brakes which is not dependent for its operation upon the strength of the motorman or upon the distance traveled by the car or cars to which it is applied, and in which the wear and tear upon the various parts are reduced to a minimum and in which the brakes may be applied and released from the main car motor controlling stand or from an independent stand, as desired. I attain these objects by the mechanism illustrated in the following drawings, in which—

Figure 1:
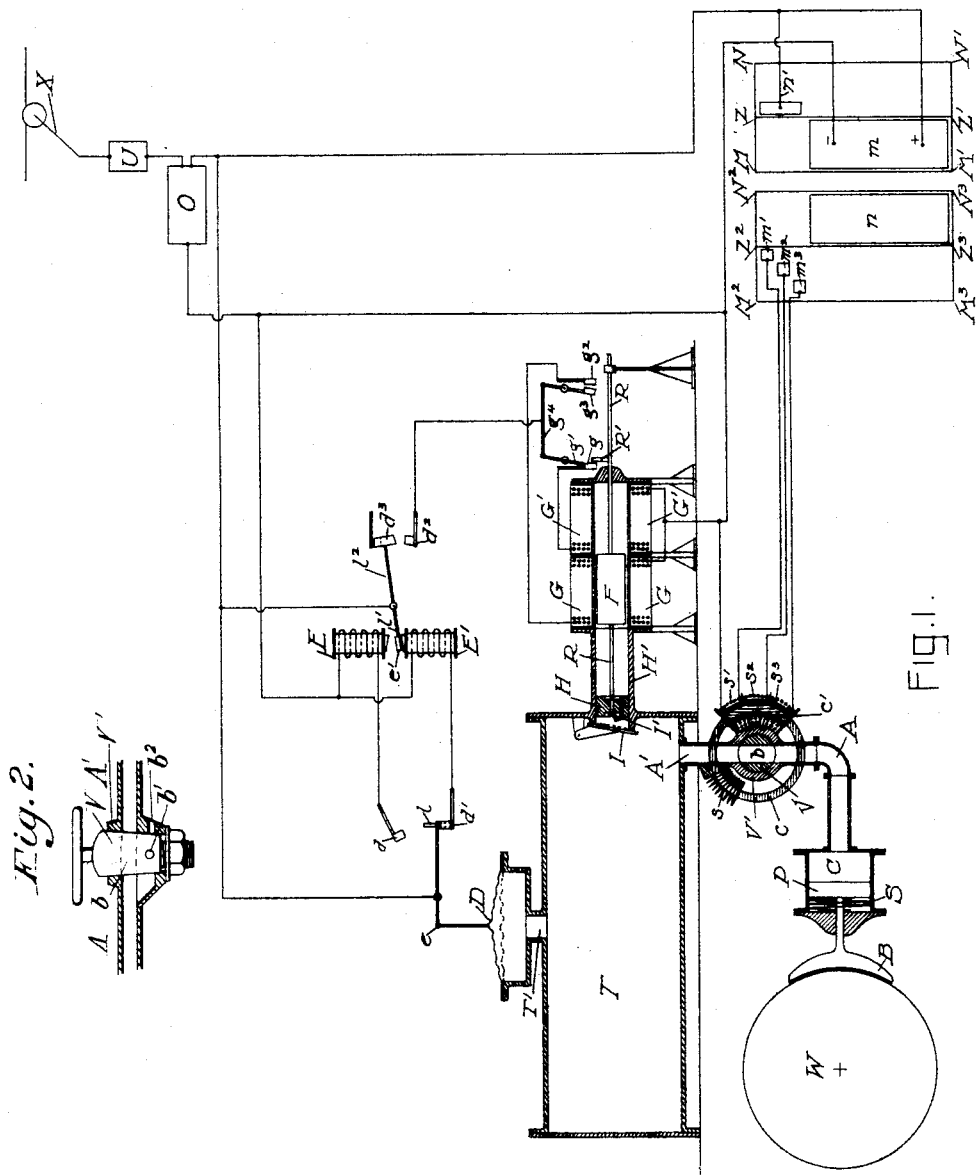
Figure 2:
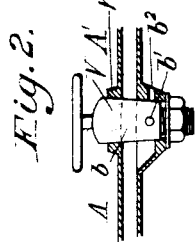

Figure 1 shows a schematic sectional view of an elevation of the system as applied to a single brake-shoe, and shows the two cylinders of the controlling-stand as developed, the outer cylinder M Z N M' Z' N' being shown as it would appear as looked through. Fig. 2 shows a section of the valve-seat V'.

Similar letters refer to similar parts throughout both views.

The power for operating the brakes is obtained primarily from an electric motor G G G' G' F R, which obtains its current from a shunt from the main current, and this motor works an air pump H I, which pumps the air and compresses it into a tank T for receiving and storing it. This receiving tank is connected by proper pipes A' A with the cylinder C in which works the piston P attached to the brake shoe B, or to the brake levers. Connected with the receiving tank by an air channel T' is a diaphragm D of such strength and elasticity that it is forced outward as the pressure in the tank T increases, and recedes as the pressure decreases. This diaphragm, D, is so connected with one end of a lever $e\, l$, which is properly insulated and connected with a shunt from the main current for the car motors, that the lever moves as the diaphragm is forced outward or recedes. The free end, $l$, of this lever moves between two contacts $d$ and $d'$, so placed that when the pressure in the tank T falls to a certain minimum point, the lever $e\, l$ engages with one contact $d$ and the current traveling through this contact and conductors, energizes an electromagnet E, and when the pressure rises to a certain maximum point the lever engages with the other contact $d'$ and the current, traveling through this contact and conductors energizes another electro magnet E'. These two magnets E and E', are placed opposite each other and between them is an anchor $e'$ connected with a lever, $l'\, l^2$, forming a switch, which is properly insulated and connected with a shunt from the main current, its other end $l^2$, carrying the contact $d^3$, engaging with a contact plate $d^2$ so placed that when the lever moves in one direction, the motor G G G' G' F R is cut in, and when it moves in the other direction the motor is cut out. Accordingly, when the pressure in the tank T reaches its maximum point, the lever $e\, l$ reaches the contact $d'$, and closes the circuit for the electro magnet E', which attracts the anchor $e'$ connected with the lever $l'\, l^2$ thus cutting out the motor G G G' G' F R, which remains at rest until the pressure in the tank T is reduced to its minimum point, when the lever $e\, l$ reaches the contact $d$ and closes the circuit for the electro-magnet E, which attracts the anchor $e'$ connected with the lever, $l'\, l^2$, thus cutting in the motor G G G' G' F R, which starts and continues in operation until the pressure in the tank T, again reaches the maximum point, when the motor is cut out again. Thus the pressure in the tank T always remains between the maximum and minimum points for which the pressure regulating system is adjusted.

The air pump for feeding the tank shown in the drawings, consists of the cylinder H', in which moves the plunger H provided with the valve I', and the valve I. The plunger H is directly connected by the rod R with the iron core F which travels through and between the solenoids G G and G' G'. The rod R is extended outside the solenoids and is provided with a tooth R', which is placed between the switch $g\, g'$ which closes and opens the circuit for the solenoid G' G' and the switch $g^2\, g^3$, which closes and opens the circuit for the solenoid G G. These switches are connected by the bar $g^4$, in such a way that when one is open the other is closed, and through the bar $g^4$ the movable contacts $g'$ $g^3$, of each switch are electrically connected with the contact $d^2$. When the circuit for the motor is closed by the switch $l'$ $l^2$, the current energizes the solenoid G' G', which draws in the core F, carrying the plunger H and moves the rod R which carries the tooth R', until when the core F is almost entirely drawn into the solenoid G' G', the tooth R' closes the switch $g^2$ $g^3$, and opening the switch $g$ $g'$, closes the circuit for, and energizes the solenoid G G, which draws back the iron core F, carrying with it the plunger H, and tooth R' which closes the switch $g$ $g'$, and the operation is repeated. This operation forces the plunger H back and forth, and opens and closes the valves I and I' and compresses the air into the tank.

Between the receiving tank T and the brake cylinder C, a valve V V' is located, which is constructed as follows: The conically shaped plug V and the valve seat V' have distinct borings forming ports $b$, $b'$, $b^2$, which are located in such a manner with relation to each other, that if the plug V is in its normal position the boring $b'$ connects the air channel A, leading from the brake cylinder C, with the outside air through the port $b^2$, but if the plug V is turned, in order to admit pressure to the brake cylinder, the connection between the brake cylinder and the outside air through the above mentioned ports $b'$, $b^2$, is broken and the other port $b$ comes into play, establishing a passage between the brake cylinder C and the tank T through the air channel A A'. When the plug V is turned back again in the other direction, the passage between the brake cylinder and the tank is broken and a passage established through the ports $b'$, $b^2$, which connect the brake cylinder with the outside air, this being the normal position of the valve.

The plug V is operated by a solenoid or system of solenoids $s'$ $s^2$ $s^3$, which draw into themselves a core $c$ $c'$, connected with the plug V. This core is also connected with a spring $s$ which draws the plug into its normal position as soon as the current passing through the solenoid is opened. The annular core $c$ $c'$, upon which the solenoid and the spring, $s$, act, is made of two sections, one section $c'$ of some magnetic substance, and the other section $c$, of some non-magnetic substance, and so placed that when the plug is in its normal position the magnetic part $c'$ of the circular core is outside of the solenoid $s'$ $s^2$ $s^3$. When the solenoid is energized, the magnetic portion $c'$ of the core is drawn into it, thus turning the plug V, and making connections between brake cylinder C and the tank T. The solenoid has three distinct coils of wire $s'$, $s^2$, $s^3$, arranged in such a manner that if current is sent through the first coil $s'$, the valve is opened one third. If the circuit is sent through the second and first coils $s^2$, $s'$, the valve is opened two thirds; and if the current is sent through the third, second and first coils $s^3$, $s^2$, $s'$, the valve is opened wholly.

The controlling stand shown in developed sections, consists of two parts, the movable cylinder $M^2$ $Z^2$ $N^2$ $M^3$ $Z^3$ $N^3$, which carries contacts $m'$, $m^2$, $m^3$, $n$, on its outer surface, and the stationary cylinder M Z N M' N' Z', which carries contacts $m$, $n'$, on its inner surface. The contacts for the operation of the valve V V' are on the upper left hand portion $m'$, $m^2$, $m^3$, of the movable cylinder, and on the upper right hand portion, $n'$, of the stationary cylinder. The contacts, shown at $n$, for the railroad motors are on the lower right hand portion of the movable cylinder, and on the lower left hand portion of the stationary cylinder. Shown at $m$. The location of the portions is determined from the zero point Z Z' at which no contacts are made with either the solenoid $s'$ $s^2$ $s^3$ or the railroad motors. If the movable cylinder of the controlling stand is turned to the right from the zero point Z Z', the contacts $m'$, $n'$, of the movable and stationary cylinders, engage on the first notch energizing the first coil $s'$ of the solenoid. When it is turned to the right, to the second notch, contacts $m^2$, $n'$, are made, which energize the second and first coils $s^2$, $s'$, of the solenoid; and when the movable cylinder is turned to the right, to the third notch, contacts $m^3$, $n'$, are made, which energize all the coils $s^3$, $s^2$, $s'$, of the solenoid. Thus the valve may be opened more or less as desired and a proportionate amount of air admitted to the brake cylinder to operate the brake. When the cylinder is turned from the third notch of the right toward the zero point, the coils of the solenoid are disenergized in the reverse order until, when it reaches the zero point, the solenoid is disenergized completely, and the magnetic portion $c'$ of the core, and the plug V are brought back to their normal positions by the spring $s$, thus connecting the brake cylinder with the outside air. When the brake cylinder is so connected with the outside air, the compressed air escapes from the cylinder C, and the piston P connected with the brake shoe B is pressed away from the wheel of the truck by the spring $s$, and thus the brake is released.

The drawings show, and this specification describes the system as applied to a single brake shoe, but is intended that, in operation, there may be either a brake cylinder and piston for each brake shoe or the piston may be connected with a lever or a system of levers connected with the brake shoes of the various wheels, or the air pipes may be extended and connected by proper couplings with pistons on other cars of a train, while one or more valves may be used at whatever points in the air passages it is found desirable to insert them.

The exact arrangement of diaphragm, levers and electro-magnets shown, constituting the pressure regulating system is not intended as essential in this invention, as any arrangement of parts which will start the electric motor, when the pressure in the air receiving tank drops to a certain minimum point, and will stop the electric motor when the pressure rises to a certain maximum point, will serve as well, and in my general claims, I regard this system as a single element of the larger system.

Instead of the double solenoid electric motor shown, any other form of electric motor properly connected with an air pump of any usual construction, for forcing air into the receiving tank may be used.

In the drawings X represents the trolley or connection with the main current; U, the switch; O, the lightening arrester; W, the wheel of truck.

What I claim as my invention, and desire to cover by Letters Patent, is—

1. In a system of brakes for electric cars, the combination of a controlling stand carrying two systems of contacts, one set connected with and controlling the current actuating the car propelling motors and the other set connected with and controlling the current of a shunt circuit, a system of solenoids through which said shunt circuit passes actuating a circular core composed of magnetic and non-magnetic substances, an air storage tank, a pressure regulating system connected with the tank by a diaphragm, an electric motor which is started by the pressure regulating system when the pressure in the tank falls to a minimum point and stopped when it rises to a maximum point, an air pump which supplies compressed air to the tank and is operated by the electric motor, a cylinder, a piston reciprocating therein, a brake shoe attached to the rod of the piston, a spring so adjusted to bear against the piston head as to press the brake shoe away from the wheel of the truck, and a two way valve inserted in the air passage between the tank and cylinder and controlled by the movable core of the solenoids and a spring, as described and for the purpose specified.

2. In a system of brakes for electric cars, a controlling stand carrying contacts which control the current for a shunt circuit, a system of solenoids through which said shunt circuit passes actuating a circular core composed of magnetic and non-magnetic substances, an air storage tank, a pressure regulating system connected with the tank by a diaphragm and so adjusted that when pressure in the tank falls to a minimum point, it closes a shunt circuit and when it reaches a maximum point, it opens said shunt circuit, an electric motor energized by and through which this shunt passes, an air pump operated by the motor and which supplies compressed air to the tank, a cylinder, a piston reciprocating therein, a brake shoe attached to the rod of the piston, a spring bearing against the piston head so as to press the brake shoe away from the wheel of the truck, and a two way valve located in the air passage between the tank and cylinder and controlled by the movements of the core of the solenoids and a spring, whereby air may be admitted to the cylinder from the tank or exhausted therefrom by the motion of the said valve as described and for the purpose specified.

3. In a system of brakes for electric cars, the combination of a tank for storing compressed air, suitable pressure regulating devices which cut in a shunt circuit when pressure in the tank falls to a minimum point and cut out said shunt circuit when the pressure rises to a maximum point an electric motor operated by the shunt circuit, an air pump operated by the electric motor for supplying compressed air to the tank, a cylinder, a piston reciprocating therein, a brake shoe attached to the rod of the piston, a spring adapted to press the brake shoe away from the wheel of the truck, and a two way valve inserted in the pipe leading from the tank to the cylinder and adapted to exhaust air from the cylinder or to admit it thereto from the tank.

4. In a system of brakes for electric cars, the combination of a tank for storing compressed air, pressure regulating devices connected with the tank by a diaphragm and adapted to close a shunt circuit when the pressure in the tank falls to a minimum point and to open said shunt circuit when the pressure rises to a maximum point, an electric motor actuated by the shunt circuit, an air pump operated by the electric motor, which supplies compressed air to the tank, whereby the pressure in the tank is always maintained between a certain maximum and a certain minimum point.

5. The combination of a double controlling stand carrying two systems of contacts, one set adapted to control the supply of current to the car propelling motors and the other set adapted to control the supply of current for a shunt circuit, a cylinder, a piston reciprocating therein, a brake shoe attached to the rod of the piston, a spring adapted to press the brake shoe away from the wheel of the truck, and a valve inserted in the pipe through which pneumatic pressure enters the cylinder from the source of pneumatic pressure and governed by electrical devices through which the shunt circuit governed by the controlling stand, passes.

6. A pressure regulating system consisting of a diaphragm D inserted in an air channel T' leading from a storage tank T, lever $el$ attached to the diaphragm and moving therewith, contacts $d$, $d'$, between which the free end of lever $el$ moves, electro magnets E and E' electrically connected with contacts $d$ and $d'$, anchor $e'$ moving between and controlled by magnets E and E', lever $l'\,l^2$ by one end of which anchor $e'$ is carried, contact $d^3$ carried by the other end of lever $l'\,l^2$ stationary contact $d^2$ with which contact $d^3$ engages, and suitable electrical connections between the various parts and the source of electric power, the electric motor whose operation is to be regulated which, when contacts $d^2$ and $d^3$ engage, is cut into, and when contacts $d^2$ and $d^3$ disengage, is cut out from a shunt circuit passing through lever $l'$ $l^2$ and suitable conductors, combined with an air pump operated by said motor and adapted to supply the tank T with compressed air.

7. In a system of brakes for electric cars, the combination of a two way valve V V', annular core consisting of magnetic $c'$ and non magnetic $c$ substances and suitably attached to the valve plug V, coils $s'$, $s^2$, $s^3$, adjoining each other and surrounding a portion of the core $c$ $c'$, spring $s$, and electrical conductors connecting the coils $s'$, $s^2$, $s^3$, with each other and with suitable contacts as described.

8. In a system of brakes for electric cars, the combination of a controlling stand carrying two systems of contacts, one series engaging when the movable cylinder is turned in one direction from a certain point closing the circuits for the car propelling motors and the other series engaging successively as the movable cylinder is turned in the other direction from said point closing the circuits for a series of shunt circuits, a series of solenoids through which said shunt circuits pass, an annular core composed of magnetic and non magnetic substances controlled by the solenoids, a spring adapted to partially counteract the attraction of the solenoids upon the magnetic portion of the core, a brake cylinder, a source of pneumatic pressure, a passage between them and a two way valve adapted to open and close said passage and to admit air to, and permit it to escape from said cylinder, the plug of said valve being attached to and governed by the movements of the core above described.

9. In a system of brakes for electric cars, an air storage tank, pressure regulating devices connected therewith, an electric motor which is started by the pressure regulating devices when the pressure in the tank falls to a minimum point and is stopped thereby when the pressure in the tank rises to a maximum point, an air pump operated by the electric motor and adapted to supply compressed air to the tank, a two way valve inserted in the passage from the tank to brake cylinders, a system of solenoids adapted to govern the motions of the two way valve, and a controlling stand adapted to control the supply of current to the solenoids, whereby the pneumatic pressure in the storage tank is always maintained between a maximum and a minimum point and the supply of compressed air therefrom to the brake cylinders is controlled by the motions of the controlling stand, as described and for the purpose specified.

10. In a system of brakes for electric cars, a controlling stand carrying two systems of contacts, one series engaging when the movable cylinder is turned in one direction from a certain point and regulating the supply of current from the source of electric power to the car propelling motors and the other series engaging as the movable cylinder is turned in the other direction from said point and regulating the supply of current to electrical devices for operating the valve which governs the supply of compressed air to and from the brake cylinders, as described.

In testimony whereof I have signed my name to this specification, in the presence of two subscribing witnesses, on this 23d day of April, A. D. 1894.

GEORGE B. DAMON.

Witnesses:
JOHN A. GATELY,
WM. F. MURRAY.